US006772164B2

(12) United States Patent
Reinhardt

(10) Patent No.: US 6,772,164 B2
(45) Date of Patent: *Aug. 3, 2004

(54) DATABASE SYSTEM

(75) Inventor: Gert J. Reinhardt, Neustadt/Wied (DE)

(73) Assignee: Ser Solutions, Inc., Dulles, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,682

(22) PCT Filed: Jul. 8, 1997

(86) PCT No.: PCT/DE97/01441

§ 371 (c)(1), (2), (4) Date: Jan. 8, 1999

(87) PCT Pub. No.: WO98/01808

PCT Pub. Date: Jan. 15, 1998

(65) Prior Publication Data

US 2002/0133476 A1 Sep. 19, 2002

(30) Foreign Application Priority Data

Jul. 8, 1996 (DE) .......................... 196 27 472

(51) Int. Cl.[7] .............................. G06F 17/30
(52) U.S. Cl. ................. 707/101; 707/102; 707/103; 707/2
(58) Field of Search .................. 707/1, 3, 100, 707/2, 4, 10, 101, 102, 104, 103

(56) References Cited

U.S. PATENT DOCUMENTS

| 4,916,605 | A | * | 4/1990 | Beardsley et al. ........... 364/200 |
| 4,918,593 | A | * | 4/1990 | Huber ......................... 364/200 |
| 5,499,359 | A | * | 3/1996 | Vijaykumar ................. 395/600 |
| 5,557,970 | A | * | 9/1996 | Abbate et al. |
| 5,729,730 | A | * | 3/1998 | Wlaschin et al. |
| 5,842,196 | A | * | 11/1998 | Agarwal et al. ............... 707/2 |
| 5,918,225 | A | * | 6/1999 | White et al. ................... 707/3 |
| 5,970,490 | A | * | 10/1999 | Morgenstern ................ 707/10 |
| 6,009,432 | A | * | 12/1999 | Tarin ........................... 707/10 |
| 6,070,160 | A | * | 5/2000 | Geary ........................... 707/4 |

FOREIGN PATENT DOCUMENTS

| EP | 0 320 266 | 6/1989 |
| GB | 2172130 | 9/1986 |

OTHER PUBLICATIONS

Peter baumann "Management of Multidimensional Discrete data", ACM, VLDB Journal vol. 3, issue 4, Oct. 1994.*

* cited by examiner

Primary Examiner—Jean M. Corrielus
(74) Attorney, Agent, or Firm—Wilmer Cutler Pickering Hale and Dorr LLP

(57) ABSTRACT

Method for performing operations in a database system in which a plurality of data sets are stored into a storage of a computer, characterized by each data set consisting of an arbitrary number of fields, each consisting of a field description as metadata and an arbitrary number of field contents, and during each storage of a data set in a storage of a computer the field contents together with the corresponding metadata being stored as a data set.

19 Claims, 11 Drawing Sheets

| Receipt No. | Date | First Name | Last Name | Receipt Type | Set-No. |
|---|---|---|---|---|---|
| 6905895 | 11.03.1993 | Hermann | Niedermeyer | Order | 17477 |
| 8558877 | 09.08.1994 | Emil | Hasenmeier | Debit Note | 09656 |
| 2905397 | 23.12.1994 | Rainer | Driesen | Letter | 00673 |
| 8348866 | 13.03.1995 | Heinrich | Tröller | Order | 06609 |
| 5608598 | 23.03.1995 | Annemarie | Schmitt | Letter | 05560 |

Table Header ↔ Table Content

Set ↑   Field

FIG. 2

| Receipt No. | Date | First Name | Last Name | Receipt Type | Department | Set-No. |
|---|---|---|---|---|---|---|
| 6905895 | 11.03.1993 | Hermann | Niedermeyer | Order | | 17477 |
| 8558877 | 09.08.1994 | Emil | Hasenmeier | Debit Note | | 09656 |
| 2905397 | 23.12.1994 | Rainer | Driesen | Letter | | 00673 |
| 8348866 | 13.03.1995 | Heinrich | Tröller | Order | | 06609 |
| 5608598 | 23.03.1995 | Annemarie | Schmitt | Letter | | 05560 |
| 1918811 | 31.03.1995 | Michael | Momm | Debit Note | AA | 19187 |
| 8908898 | 13.01.1996 | Emil | Müller | Letter | A | 08904 |

| Receipt No. | Date | First Name | Last Name | Receipt Type | Set-No. |
|---|---|---|---|---|---|
| 8908898 | 13.01.1996 | Emil | Müller | Letter | 08904 |
| 5608598 | 23.03.1995 | Annemarie | Schmitt | Letter | 05560 |
| 8348866 | 13.03.1995 | Heinrich | Tröller | Order | 06609 |
| 1234567 | 25.01.1996 | Karl | Meyer | Order | 12900 |
| 6905895 | 11.03.1993 | Hermann | Niedermeyer | Order | 17477 |
| 2905397 | 23.12.1994 | Rainer | Driesen | Letter | 00673 |
| 1918811 | 31.03.1995 | Michael | Momm | Debit Note | 19187 |
| 8558877 | 09.08.1994 | Emil | Hasenmeier | Debit Note | 09656 |

FIG. 5A

| Field Content | Descriptor | Set-No. | UIP |
|---|---|---|---|
| 09081994 | Date | 09656 | FF99 |
| 11031993 | Date | 17477 | F0E3 |
| 1234567 | Receipt-No. | 12900 | CD12 |
| 13011996 | Date | 08904 | 0495 |
| 13031995 | Date | 06609 | O6AE |
| 1918811 | Receipt-No. | 19187 | D7E2 |
| 23031995 | Date | 05560 | F177 |
| 23121994 | Date | 00673 | AA50 |
| 25011996 | Date | 12900 | AB10 |
| 2905397 | Receipt-No. | 00673 | C4C1 |
| 31031995 | Date | 19187 | 7863 |
| 5608598 | Receipt-No. | 05560 | 34FA |
| 6905895 | Receipt-No. | 17477 | 57DD |
| 8348866 | Receipt-No. | 06609 | 6A13 |
| 8558877 | Receipt-No. | 09656 | 50F5 |
| 8908898 | Receipt-No. | 08904 | OO45 |
| Annemarie | First Name | 05560 | 22E3 |
| Order | Receipt Type | 06609 | B929 |
| Order | Receipt Type | 12900 | 8990 |
| Order | Receipt Type | 17477 | 3F29 |

| Field Content | Descriptor | Set-No. | UIP |
|---|---|---|---|
| Letter | Receipt Type | 00673 | 6554 |
| Letter | Receipt Type | 05560 | F1FB |
| Letter | Receipt Type | 08904 | 3F29 |
| Driesen | Last Name | 00673 | 649B |
| Emil | First Name | 08904 | 1A21 |
| Emil | First Name | 09656 | DA41 |
| Hasenmeier | Last Name | 09656 | F3C2 |
| Heinrich | Last Name | 06609 | 774E |
| Hermann | Last Name | 17477 | 9064 |
| Karl | First Name | 12900 | 9134 |
| Meyer | Last Name | 12900 | 4685 |
| Michael | First Name | 19187 | ADF1 |
| Momm | Last Name | 19187 | 51BB |
| Müller | Last Name | 08904 | 0400 |
| Niedermeyer | Last Name | 17477 | 5F20 |
| Rainer | First Name | 00673 | 27FB |
| Debit Note | Receipt Type | 19187 | BD11 |
| Debit Note | Receipt Type | 09656 | BC34 |
| Schmitt | Last Name | 05560 | 19EE |
| Tröller | Last Name | 06609 | 32A1 |
| Receipt-No. | Descriptor | 18907 | 3393 |
| Date | Descriptor | 12333 | B158 |
| Receipt Type | Descriptor | 05001 | 112A |
| Last Name | Descriptor | 06107 | 99E3 |

FIG. 5B

Person Information

| No. | First Name | Last Name | Height | Colour of Eyes |
|---|---|---|---|---|
| 1 | Karl | Meier | 1,80 | Blue |
| 2 | Paul | Müller | 1,93 | Green |
| 3 | Herbert | Paul | 1,75 | Brown |

FIG. 6

| Search Term | Descriptor | Data Object ID (Data Set No.) |
|---|---|---|
| Adam | First Name (Person Information) | 0002-0001 |
| ... | ... | ... |
| Eva | First Name (Person Information) | 000200002 |
| ... | ... | ... |
| Herbert | First Name (Person Information) | 000100001 |
| Karl | First Name (Person Information) | 000100001 |
| Paul | First Name (Person Information) | 000100002 |
| Paul | First Name (First NamenInfo) | 000204711 |
| Paul | Last Name (Person Information) | 000100003 |
| ... | ... | ... |
| Person Information | Table | 000100001 |
| Person Information | Table | 000100002 |
| Person Information | Table | 000100003 |
| ... | ... | ... |
| First Name Information | Table | 000200001 |
| First Name Information | Table | 000200002 |
| First Name Information | Table | 000200003 |
| | | |

FIG. 7

| Last Name | First Name | Company | Date | Pseudonym | Receipt-No. |
|---|---|---|---|---|---|
| Müller | Karl | - | 13.03.1996 | - | - |
| Meyer | Karl | - | 25.01.1996 | - | 1234567 |
| - | Gustav | Karl | 26.01.1996 | - | 4567890 |
| Müller | - | - | 12.03.1996 | Karl | - |

Hit List

Display | Continue | Cancel

FIG. 9

| Hit List | | | |
|---|---|---|---|
| Last Name | First Name | Date | Receipt-No. |
| Müller | Karl | 13.03.1996 | - |
| Meyer | Karl | 25.01.1996 | 1234567 |

Display    Continue    Cancel

FIG. 10

| Field Content | Descriptor | Set-No. | UIP |
|---|---|---|---|

Partial Index 1

| | | | |
|---|---|---|---|
| Karl | First Name | 12900 | AA09 |
| Karl | First Name | 67847 | A112 |
| • | | | |
| • | | | |
| • | | | |
| Marx | Last Name | 09967 | 18A3 |

Partial Index 2

| | | | |
|---|---|---|---|
| Kohle | Fuel | 10843 | 4121 |
| • | | | |
| Karl | First Name | 12900 | AA09 |
| • | | | |
| Peter | First Name | 06271 | 4390 |

Partial Index n

| | | | |
|---|---|---|---|
| Werkmann | Last Name | 43561 | 4BA1 |
| • | | | |
| Karl | First Name | 12988 | ADF0 |
| • | | | |
| House | Building | 78324 | 3330 |
| • | | | |
| Printer | Device | 23456 | 309D |

Overall-Index

| Field Content | Descriptor | Set-No. | UIP |
|---|---|---|---|
| Karl | First Name | 12900 | AA09 |
| Karl | First Name | 12988 | ADF0 |
| Karl | First Name | 67847 | A112 |
| • | | | |
| Kaliumhydroxyd | Chemical Substance | 11223 | AF34 |
| • | | | |
| Georg | First Name | 04653 | EEEFA |
| • | | | |
| Peter | First Name | 06271 | 4390 |
| • | | | |
| Werkmann | Last Name | 43561 | 4BA1 |
| • | | | |
| House | Building | 78324 | 3330 |
| • | | | |
| Marx | Last Name | 09967 | 18A3 |
| • | | | |
| Printer | Device | 23456 | 309D |

FIG. 11

DATABASE SYSTEM

FIELD OF THE INVENTION

The invention relates to a database system, in particular to a database system in which a database comprising a plurality of data sets is stored, further a method for storing, amending, and displaying the database, as well as a method for searching in respectively for accessing to the database.

BACKGROUND OF THE INVENTION

A database system usually comprises a stock of data, the so-called database, which is stored in a machine-readable storage, as well as a data processing system on which one or more application programs are running, in order to be able to access the database by means of a control program, the so-called database management system, as well as to be able to display components of the database, to search for components, and to modify the database, to input new data, etc.

The interpretation of the data in the database is done by means of metadata, which are "data about the data", said metadata being required by said database management system and being separately stored by said system. The metadata are data descriptive for the fields of the data sets and for all other attributes of the database system.

In all known database systems the database is stored in a structured form, according to the state of the art in form of a table. The database thereby comprises individual data sets, which again consist of individual data fields. If the information in the data sets is dividable into several fields, with the meaning of the n-th field in each data set being identical, then this is storage in a structured form. The contents of the fields may be different.

An example for such a structured database in the form of a table is shown in FIG. 2.

The individual data sets are the rows of the table, in which in respective individual data fields information is contained about receipt number, date, first name, last name, and type of the receipt. The last field of each data set contains a set number, which is an identification number to unambiguously identify the data set. All data sets not only have the same number of data fields, the data fields of each data set also can be categorized according to a structure which is common to all data sets.

For example, each data set contains a field which may be described or identified as receipt number, another one as the date, another one as the first name, etc. The individual data sets are put together into a table the columns of which are characterized by a common description of their content. The structure of the table therefore is prescribed by the descriptions which are present in the header of the table of FIG. 2. The fields of the table header contain further information which is not shown about the content of the individual columns of the table, so-called metadata for the individual fields of the data sets of the table. Basically, in conventional database systems, data of the database are stored in such a structured form, which means there is a prescribed table structure into which the data sets to be stored have to fit with respect to the number of fields and with respect to the description of the field content, however, also with respect to the data type or the data structure of the content of the field.

Because of the prescribed structure according to which the data have to be stored, it is not possible in conventional database systems in case of a structure according to FIG. 2 to store further information which does not fit into this structure. For example, if only for some of the data sets additional information is to be stored, then for this purpose the structure of all of the stored data has to be changed. An example is shown in FIG. 3.

In order to further store a department identifier, even if this information is to be stored only for some of the data sets, an additional column "department" has to be inserted into the table.

Therefore, in conventional database systems, there is a prescribed structure which is mandatory for the individual data sets, and the individual data sets then are combined into a table as shown in FIG. 2 or in FIG. 3. Thereby there exists a prescription for the individual data sets with respect to their description but also with respect to their data format by the overall structure of the table which is formed by the data sets. With respect to their description, their data format, so to speak with respect to their metadata, the contents of the individual fields of the data sets may only be amended by amending the overall structure of the table as a whole. However, such an amendment of the structure of the whole table, like the amendment from FIG. 2 into the one of FIG. 3 influences the structure of all, also the already existing data sets.

The data sets being combined into a table are called the database table. The sum of the metadata of all database tables of the database, which themselves may be individually different, form the so-called data model of the database system.

This kind of structured storage of the data means that for each storage of data sets it is required that the data sets which are to be stored with respect to their structure fit at least into a partial structure of the database.

Therefore, if a data set is to be stored the structure of which is not in accordance with the existing data structures or, with parts thereof, then the database has to be extended by the new structure element (field/fields) before the data set can be stored.

The data structure resulting from the tables not only is formed in the database itself but also is reflected in the database management system as well as in the application programs. For this reason the following problems arise.

Requests for amendments with respect to the data structure are input by the users and therefore at first are forwarded to the application software. However, this then leads also to an amendment of the data model of the database. Furthermore, the amendments of the user requirements have to be defined by the user, and if they are realized they lead to amendments in the database management system, since this system has to be adapted to the structure of the database. This results in a continuing degeneration of the data structures. For example, it may happen that when inserting new columns, not all fields of the column are written into, thereby some of the fields of the whole table which is formed of the individual data sets remain empty.

A particular problem is the storage of data sets having a new data set structure. This data set structure has to be defined by the user. For this purpose amendments in the database management system as well as in the application programs are necessary.

The structured storage of the data in the form of a table therefore leads to a lot of work to be done by the system administrator as a result of the requirements or the demands set forth by the users towards the database. The structure of the database has to be adapted and amended continuously.

In conventional database systems the data sets are ordered in the form of a table. Each data set consists of several data fields. Each data field consists of a descriptor and a field value (field content). The descriptor thereby describes the field value. This means that the descriptor describes the fields with respect to the type respectively the meaning of their field values. For example, all data fields, the contents of which are "body size" have the same descriptor. Based on these structured data sets then the structured database is formed in the form of a table. This conventional method requires confirmed or hypothetic information about the structure of the data sets to be stored. These information are required in order to define the data model which enables the storage of all data sets, which potentially have to be stored based on the existing information. To store the usually inhomogenious overall set of expected data sets, database tables are defined, whereas each database table only stores data sets having the same structure. The sum of all definitions of all database tables forms the abstract data model of the database system.

It is readily apparent that the data model of each database table has to take into account all data fields of all the data sets which potentially have to be stored in this database table, in particular with respect to their data format. In order to do so for each descriptor which may potentially occur in a data set, the attributes are described. Attributes thereby describe the data format and the type of use (e.g. "to be indexed" or "not to be indexed") of the field value. Thereby the so defined database table is capable of storing data sets which are in accordance with the predefined structure. This data model then may be visualized by assigning a descriptor to each column of the database table. A data set then corresponds to a row in this database table. In each column the field value which corresponds to the descriptor is written if the data set contains a corresponding field value. Not necessarily there has to be a field value for each descriptor in each data set. This leads then to data fields in the database table which remain empty.

This type of storage of data sets in a so formed database system has the disadvantage that at first a data model has to be defined which takes into account each descriptor which may potentially occur in a data set as well as its data format. However, such a data model can only be built if complete and correct information exists about the structure of the data sets which are to be expected. This precondition can be fulfilled only in very rare cases.

The information turning out when analyzing the problem usually is not capable of fully describing the data sets which actually have to be stored. By defining a data model an abstraction has to be made, which means simplifying assumptions have to be made which possibly lead to an incomplete data model. This incomplete data model then possibly has to be modified, extended, simplified, or amended in any other way, at a later stage. Furthermore, when analyzing a problem not necessarily all aspects which influence the data model are taken into account. This also leads to an incomplete data model.

Another reason for an incomplete data model relates to the data model itself being of necessarily statistical nature. If at a certain time complete information about the structure of the data sets to be expected is given, then a complete data model may be developed. However, the information on which the data model is based may change from time to time, which then again leads to an incomplete data model.

The system deficiencies resulting from an incomplete data model lead to requests for amendment from the users. These requests for amendment from the users then result in an improvement of the data model being necessary which has to be carried out by the system administrator/programmer. The so improved data model may then possibly be incomplete again so that a further improvement has to be carried out.

An attempt to minimize the necessary workload is the use of a development framework (e.g. 4GL-language) which is as comfortable and as powerful as possible. Amendments in the database management system then can be executed more easily.

However, the basic problem of the conventional approaches remains the same: a static data model has to be defined which as time passes by has to be adapted to the requirements of the users by continued amendments. These continued amendments in the long run lead to a degeneration of the data model. Despite the amendments being possibly carried out automatically from the point of view of the system administrator, this is not suitable to solve the problem itself.

It is therefore an object of the present invention to provide a method by which the data of a database can be stored in an optimized manner. Furthermore, fast access to the database should be possible, and it also should be possible to display and if necessary to modify the data of the database in an easy and flexible manner.

SUMMARY OF THE INVENTION

The core of the invention consists in the fact that when storing a database the formation of a structured data model for the database is dispensed with, and instead the database is stored in a manner which does not make the definition of the data model for the purpose of storage in the database system necessary anymore. Neither manually nor by an automatically executed algorithm data models for the database system are generated.

This is accomplished by the fact that with storage of each data set complete information about the structure of the data set is stored together with the data set. This means that each data set additionally to the user data (or useful data) contains a complete description of the structure of the data set. Thereby the storage of the data set becomes independent of a superordinate or overall data model since the data set has not to be adapted to the structure of an existing or prescribed data model. Each data set contains its complete metadata which contain a complete description of the data set. Thereby the limitations are overcome which result from the fact that in conventional database systems data sets of the same kind are combined into tables through which a data model is described to which newly inserted data sets have to be adapted. Each data set is with respect to its structure completely independent of the other stored data sets and thereby the definition of a superordinate overall data model becomes obsolete.

The lack of a superordinate data model in which several data sets of the same structure are combined leads to a significant reduction of the necessary administrative efforts for the stored data. For example, the database management system does not have to reflect a superordinate data model and therefore does not have to be adapted to an amended superordinate data model if amendments or storage of new structures are carried out. In the database according to the present invention there is no superordinate structure with a plurality of combined data sets, but only a minimum structure which consists of the individual data set itself which at the same time contains a complete description (metadata)

about itself respectively about its structure. Each data set consists of an arbitrary number of fields, whereas, however, contrary to the conventional database, each field of a data set of the database according to the present invention in addition to the possibly several fields contains a complete description (metadata) of the field contents.

Each field can contain several field contents, where then the field description fully and completely describes all field contents with respect to their format. In particular, a first field content may consist of user data, while a second field content of the same field may consist of a descriptor which describes the user data with respect to their meaning. The field description then contains the attributes for the user data as well as for the descriptor, which means for both field contents. The attributes thereby describe the individual field contents with respect to their data structure, which means for example with respect to their data type and their length in bytes. They also may define whether a field content is a descriptor or user data. Basically the number of field contents of a field is arbitrary, important is the fact that the field description contains the attributes for all field contents. Which of the possibly several fields contents finally consists of user data and which of a descriptor for one or more field contents consisting of user data may thereby also be determined in the description. However, this may also be simply determined by convention with respect to the order, for example in such a way that every second field content always consists of the descriptor for its preceding field content.

As a matter of course, individual field contents may remain empty despite them being defined in the field description as part of the field. In principle according to the present invention the contents of the field are neither with respect to their number nor with respect to their format determined by a superordinate structure. Format and number of the field contents as well as the question whether the field contents are user data or descriptors may be chosen freely in an arbitrary manner for each field of each data set since the field description describes the field with respect to these determinations completely by means of the attributes contained in the field description. This results in a symmetry or duality between descriptors and user data in the configuration of a data field as well as in the configuration of a data set. This duality or symmetry may be continued by treating user data and descriptors in the same manner also during the further processing of the data sets or the individual data fields, which means when indexing, searching, or accessing fields or data sets, or when presenting and modifying fields or data sets. Even parts of the field description may be included in this equal treatment, the parts of the field description then being treated in a similar manner as the field contents.

In the database according to the present invention there is no superordinate or overall structure for storing similar data sets, but rather a minimum structure which cannot be further simplified for storing the fields which consist of the metadata of the field and of the field contents, which again may be user data or descriptors. Each data set consists of an arbitrary number of fields. The descriptors of the fields of a data set not necessarily have to be unique. Multiple identifications may be simply reflected in the database according to the present invention by storing multiple fields having the same descriptor in one data set.

A descriptor assigns to its corresponding field content consisting of user data a semantic meaning, which means it characterizes the field content consisting of user data with respect to its meaning. In the database according to the present invention a field content consisting of a descriptor is handled in principle in the same manner as a field content consisting of user data, which means both may consist of arbitrary bit sequences of an arbitrary format since their format respective their structure are defined in the corresponding field description. For the database system according to the present invention when processing field contents it does not matter whether the field content consists of user data, like a bit sequence representing an image, or consists of a descriptor which characterizes the bit sequence representing an image with respect to its meaning as an "image". The user data value as well as the descriptor in principle may consist of arbitrary bit sequences. Only when the data are to be displayed to the user the application program has to distinguish between descriptor and user data value in order to enable the user to recognize wether the information is a user data value or information which characterizes a user data value (or a user data bit sequence) with respect to its meaning. It is therefore necessary that somehow it is determined whether a field content consists only of user data or of a descriptor, besides that, however, every field content is arbitrary in its structure and only has to be defined by the field description in a sufficient manner.

When processing the data sets stored according to the invention, it therefore does not matter whether the field contents to be processed are user data or whether they are descriptors which characterize other field contents with respect to their meaning. All field contents may be processed in the database system according to the invention in substantially the same manner, and in particular they may be indexed in the same manner.

Also hierarchical data structures may be represented in a data set by incorporating into a data set fields as well as sub-data sets. The sub-data sets themselves may again consist of fields and further sub-data sets. On the lowest hierarchical level, however, a sub-data set only consists of fields. Thereby a hierarchical data set finally consists only of fields, which may be stored (in the database according to the invention) in the minimum structure which cannot be further simplified.

The storage of the fields contained in a data set is performed two-fold for the fields belonging to the index. At first the data set as a whole is stored in an unstructured memory (the data set region) with a unique data set number being assigned thereto. A data set stored in the data set region thereby contains the metadata as well as the field contents, which may be user data, descriptors, or descriptors of descriptors. All fields or selected fields only further are stored in a memory which corresponds to the universal minimum structure, the index region. The minimum structure consists of the descriptor, the user data value, the data set number (by means of which the whole data set can be referred to respectively by means of which the fields with the same data set number may be brought together in the index), as well as of an identifier for the access protection (called UIP).

The index region thereby serves as an access path to the data set region in which the whole data set is stored. In the index therefore not necessarily all information has to be stored, but only the information which is necessary for the access to the data set region. In particular, not all information contained in the descriptor has to be stored into the index region.

To enable a fast access to the data region, the index region is in most cases sorted according to the user data value. However, also other ways of sorting may be desirable, for example according to parts of the descriptor. The database according to the invention thereby not only enables an access to the data sets through the user data value, but also through the descriptors.

The duality of user data value and descriptor contained in the universal minimum structure of a field thereby is used also for the access to the stored data sets.

In a further particular embodiment the database comprising the data set region and the index region may be subdivided into sub-data stocks, in order to simplify the administration of a possibly very large stock of data. Such a division may be carried out based on the content of special fields.

In a further particular embodiment the subdivision of the database is performed according to the date of creation of a data set. Thereby a database which is growing endlessly in time may be realized.

In a further particular embodiment the field description contains information about the data type, the length of the data, as well as about the fact whether the respective field content is user data or is a descriptor. The attributes which thereby are stored for each field relate to the field contents consisting of user data as well as to the ones consisting of descriptors. Thereby it is in particular possible that the field descriptors may be interpreted like user data. This data set then is stored as a whole with an associated data set number in a storage, thereby the data set number being a particular field content of a field of the data set, and this field content being characterized in that the descriptor "data set number" exists only for a single field in the data set.

The field description may occasionally contain further information, for example about the protective status of the user data as well as the descriptors, which means about the access rights to this data. The user data of the individual field of the data sets then are stored in a logical list as a tuple together with the data set number and the corresponding descriptor, possibly also together with further additional information like the protective status. This logical list is sorted according to at least one criterion and serves as overall-index for the access to the sets of the database. This overall-index thereby is indexed over at least the field contents consisting of user data, arbitrarily additionally over the descriptors. By means of this one-fold or two-fold indexed overall-index access to or search for individual user data respectively descriptors is enabled. The one-fold or two-fold indexing of the list can be extended also to further information, for example by indexing also parts of the field description (for example the data type) so that it is also available as an access criterion. The storage of information about the protective status of the individual fields (UIP user information protection) thereby enables the protection of individual fields (user data and descriptor) from the access through users to whom no access right is granted already on the level of the fields or the descriptors, respectively.

In a further particular embodiment the indexed overall-index may be divided into partial indices. Thereby a division of the possibly very large stock of data into sub-data stocks which can be more easily administrated and which may have assigned an external name to it becomes possible.

In a further particular embodiment the division of the overall-index into partial indices is carried out according to the period of time of the creation and/or the use through the user, an information which arbitrarily may be stored together with the information about the protective status as a part of the field description.

By indexing not only the field contents consisting of user data but possibly also the descriptors and/or parts of the field description in the linear list the database enables the presentation of and the access to respectively the search for the field descriptions in the same manner as for the user data and the descriptors.

According to the invention every data set is stored individually together with information about its structure. Additionally particular (if desired even all) fields of the so stored data sets are indexed into a list. Therefore a partly redundant storage of the data, once as a structured data set and a second time as individual fields (partly or complete) in the indexed list is performed. During the second storage of the fields of the data sets in a list by means of the field description it may be determined which fields, which field contents, possibly also which parts of the field description, are to be indexed. These determinations thereby also are stored in the field description.

The fact that the structured data sets also have to be stored, however, does not mean that a data model has to be formed. Every structured data set is stored in its own right, independently of the data sets which are additionally contained in the database. Thereby every data set may contain data of an arbitrary format since it is independent of the other data sets.

BRIEF DESCRIPTION OF THE DRAWINGS

The present invention will be described in more detail by means of several embodiments and by making reference to the accompanying drawings, in which:

FIG. 2 shows a database table of a conventional database;

FIG. 3 shows a modified database table of a conventional database;

FIGS. 5*a* and 5*b* show the linearization of the database table of the database according to the present invention, whereas in FIG. 5*a* there is shown a database table and in FIG. 5*b* there is shown an overall-index;

FIG. 6 shows a database table of a conventional database;

FIG. 7 shows an overall-index of a database according to the present invention;

FIG. 9 shows the result of a search in a database according to the present invention in case of a search without the designation of a descriptor;

FIG. 10 shows a result of a search in a database according to the present invention when performing a search with the designation of a descriptor;

FIG. 11 shows the division of the overall-index into partial indices.

DETAILED DESCRIPTION OF THE DRAWINGS

Figure 1:
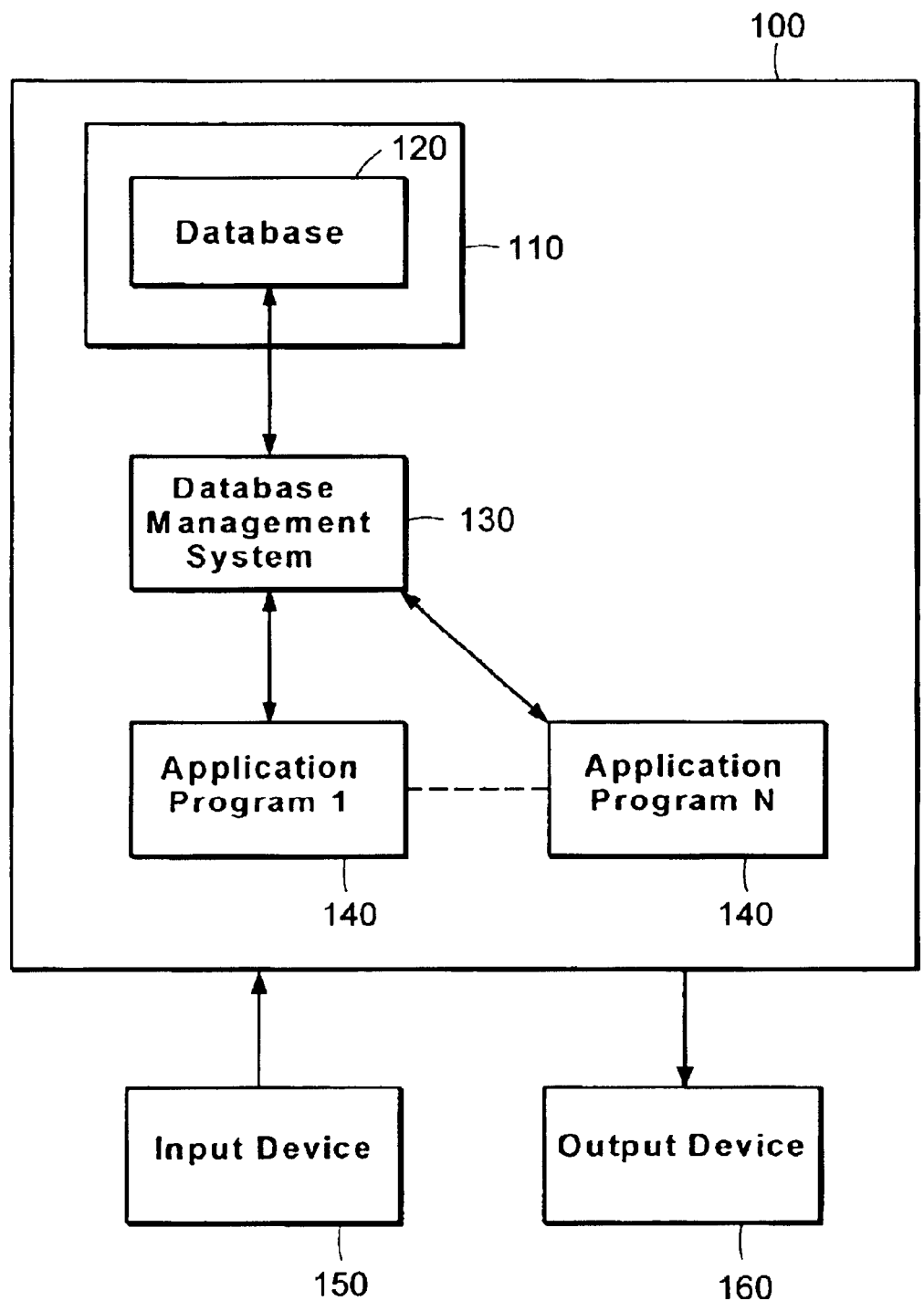
FIG. 1 shows a general representation of a database system.

In FIG. 1 there is shown a database system schematically which is realized by means of a data processing system 100. In a machine-readable memory 110 a database 120, into which data may be input, is stored, and several application programs 140 can access the database by means of a control program 130, the database management system. The control program 130 and the application programs 140 thereby are running on one or more data processing systems 100. The retrieval, storage, modification, and search of data of the database is performed by means of the application programs 140 via the control program 130. The user may by means of an input device 150 or an output device 160 access the data, input data, or may cause data to be output. The actual database thereby consists of the database 120 and the database management system 130. A superordinate data model 170 is prescribed by metadata and predetermines a structure for the data stored in the database.

The data of the database is divided into data sets, whereas the individual data sets consist of an arbitrary number of fields. In this form the data sets are stored in the storage 110, which may be an arbitrary machine-readable memory.

Figure 4A:
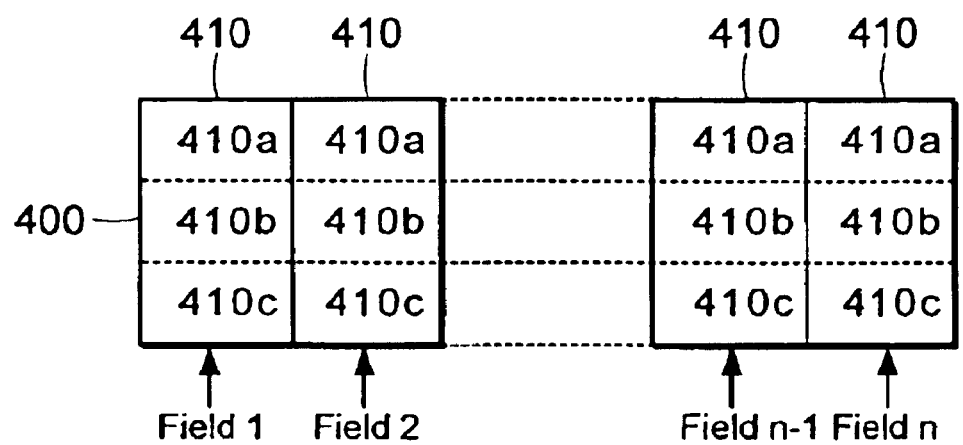
FIG. 4*a* shows a data set of an arbitrary structure as it is stored in a database according to the present invention.

According to a first embodiment, each data set is stored in a form which is shown in FIG. 4a.

Every stored data set 400 or every data set to be stored thereby consists of an arbitrary number of fields, field 1, field 2, . . . , field n, which are referenced by numeral 410 and which respectively are subdivided into a descriptor as a field content 410a, a field description 410b which may contain attributes, and a field content 410c as user data. The field description 410b contains information about the data type, the length of the data, and possibly the UIP (user information protection). Thereby the data set 400 is completely defined by the description stored together with it, respectively together with each field 410, and it is completely independent in its structure from the other stored data sets or the data sets to be stored. In extreme cases thereby each of the data sets stored in the database may be of different length and may have different field descriptions/descriptors. For example, one data set may contain image data as user data of the field 2, which are further defined by the field description and the descriptor of field 2 of FIG. 4a, while another data set in field 2 may contain text data, number data, or the like, as user data, which again is defined by the field description and possibly the descriptor of the corresponding field 2 with respect to its meaning. Thereby a superordinate data model into which data sets of the same structure are combined becomes obsolete.

It is important that the field content 410a serving as descriptor as well as the field 410c consisting of user data are not predetermined by a superordinate structure but only by the attributes which are contained in the field description 410b. From that there results a certain duality between field contents having descriptor properties and field contents consisting of user data, which means during the further processing of the so stored field contents descriptors and user data may be treated in completely the same manner. This is particularly important if the so stored data sets are to be indexed in order to generate a list of search terms. The duality or ambivalence of the field contents, independent of them being descriptors or user data, leads to the fact that during the later indexing of the individual fields of data sets not only user data but also the descriptors may be indexed.

It is readily apparent that under the presumption of a suitable field description the field content 410c itself may again be a data set, or it also may be a pointer to a data set. In principle also any so-called BLOB (binary large object) may be stored as user data or as a descriptor, which then is defined by the corresponding field description with respect to its property as descriptor or user data.

The so formed data set 400 is then stored under a unique data set number in a machine-readable memory. The data set number is for example the field content 410b of a particular field, which is particular with respect to the fact that only for one field of the data set the descriptor is "data set number".

Every data set is stored in the described form consisting of description and content and is identifiable by means of its unique data set number. In this form it also encounters the user when being retrieved, under the condition that the user has the access right for all fields of the data set.

Figure 4B:
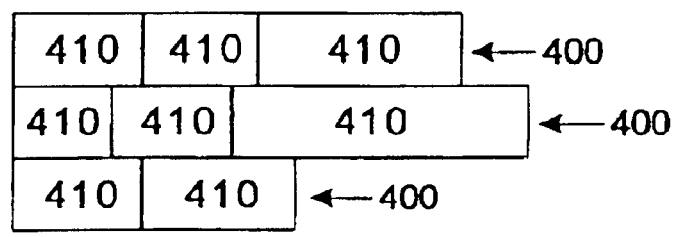
FIG. 4*b* shows a database table of an arbitrary structure as it is formed by the data sets according to FIG. 4*a;*

By the described storage of each data set together with its description therefore in case of the database according to the present invention there results no database table with a prescribed structure like in the conventional databases, but rather the sum of all stored data sets results in case of the database according to the present invention in a database table of an arbitrary structure like it is shown in FIG. 4b with three data sets 400 of arbitrary length. In particular, each field may also contain an arbitrary number of field contents.

The field description 410b thereby contains several attributes, in the first embodiment information about the data type and the length of the field contents, as well as the description of the field contents (user data or descriptor), also information about the protective status, the person who has created the field, the date of the creation of the field and the date of the most recent reference being made to the field as well as further optional information (UIP user information protection) of the fields, i.e. in particular about the access rights to the fields for the users. This information in the field description may also relate to respective individual field contents. In particular in the field description there may be stored information as to whether the corresponding field or the individual field contents of the corresponding field are to be indexed during an indexing. Therein it is stored if at all, and if so, for which person, there exists an access right to the user data and/or to the descriptor. The UIP may also contain information as to whether the field as a whole should appear at all to a user when the data set is accessed, which means whether a certain user should be able to recognize at all that such a field exists. If for example in the UIP a certain field is described as being recognizable only for certain users, then other users while accessing the data set are unable to recognize at all that the data set contains such a field. The UIP may also store such access information separately for user data and descriptor so that for example it may recognized that the descriptor exists, however, that the user data may not be accessed. The field description may also contain indications as to whether a field should be indexed or not when forming an index. Also it may be determined which field contents and possibly which parts of the field description should be indexed.

Besides this information about access rights in the field description 410b respectively in the UIP also arbitrary other information may be stored, which relates to either the data set as a whole or to the content of individual fields, for example information about access times or access frequencies to the data set as a whole or to parts of the data set, to individual fields, or to individual field contents. Generally the UIP may contain arbitrary administration information relating to the field. For example, there may be stored information about the date respectively the time of the creation of individual fields or individual field contents, or of the whole data set.

It is important that the data set forms a self-consistent structure independent of other data sets, which consists of fields, each field consisting of a complete description of the field contents, whereas the field contents may consist of user data or of descriptors of the user data.

The database table of arbitrary structure which is formed of such arbitrarily structured data sets (see FIG. 4b) is then linearized. Linearization means once more storing the individual fields which are characterized as index fields, respectively the field contents and/or possibly parts of the field description together with the common data set number, to thereby obtain a list of access terms according to which data may be ordered and searched. Thereby the field contents of the individual fields and possibly of parts of the field description are stored once more together with the data set number as n-tuple (minimum of n=4). The complete set of these n-tuples then forms a logical list of all access terms. It is important thereby that the field contents as well as possibly parts of the field description, if they are to be used during the linearization, are treated equally during this linearization. This means that the field content(s) themself (-ves) as well as eventually parts of the field description may serve as a search term in the logical list by forming an index over each of the columns of the n-tuple.

Thereby for each field content of the logical list a descriptor and a corresponding data set number (set-No.), information relating to the format as well as the UIP are stored. FIG. 5 shows such a conversion of a database table 510 (FIG. 5a) into an overall-index 520 (FIG. 5b). The overall-index is formed from the logical list by indexing, the indexing over the fields stored in the logical list as n-tuples thereby is performed as recognizable from FIG. 5b not only over the field contents consisting of user data but also over the field contents consisting of descriptors. Therefore the field contents consisting of descriptors, such as receipt number, date, etc., also appear as search terms in the overall-index. Besides these descriptors also further parts of the field description may be indexed, which then also would appear in the overall-index as search terms or access terms. For example the length of the data sets as a whole could appear as a search term in the overall-index. In principle it is possible to index over each part of the field description if desirable. For that purpose when forming the logical list the parts of the field description over which indexing is to be performed are stored as a field of the n-tuple formed from a data set.

The generation of the overall-index was described hereinbefore by means of the intermediate step of creating of a logical list from the individual data sets, respectively from the individual fields of the data sets. The overall-index, however, may also be generated directly without this intermediate step from arbitrarily structured data sets according to FIG. 4b. Thereby the field description may contain information as to what actually is to be indexed when forming the overall-index. By means of this information individual data sets, individual fields, even individual field contents may be precluded from being indexed. Furthermore, given a corresponding field description as already mentioned, also parts of this field description may be indexed when forming the overall-index. Thereby even the information stored in the field description may be searched as search terms or information terms.

However, in particular from FIG. 5b the special advantage of the duality of descriptors and user data is apparent. Indexing may be performed over both of them when forming the overall-index, so that both of them may be searched.

The usage of parts of the field description when forming the overall-index, so that indexing is performed over parts of the field description, is not shown in FIG. 5b, however, it may be carried out in an analogue manner. In that context it should be mentioned that it is not necessarily required when forming the overall-index that the descriptor exists for each search term, the column "descriptor" for a search term may also remain empty.

Also the information of the UIP which are shown in FIG. 5b are only optional. What is required for the formation of the overall-index are the search term, the data set number, and information about the format respectively about the structure of the indexed search terms, possibly also the data set number. In the case of FIG. 5b this information is contained in the column UIP.

One should, however, note that the database table 510 only accidentally comprises data sets of the same structure. This is not at all necessary in case of the database system according to the present invention, the database table could as well contain data sets of different structure.

In FIG. 5b the overall-index 520 is formed only from the field contents (user data and descriptors) as search terms. Besides that, as already mentioned, the data set number is stored, in FIG. 5b also the UIP is stored in this linear list. The UIP thereby contains in this example the information about the format of search term, descriptor, and data set number.

The search in the database itself then is conducted by means of the linearized database table, which means through the overall-index 520. How this overall-index actually is formed, which means what actually should be possible to be used as a search term, may depend on the desires of the user. In principle, the field content as well as any arbitrary parts of the field description may be used as a search term. Because of the equal treatment of field description and field content in principle all elements of the field description and the field content, which means for example even the length of the user data or their data format, may be stored as search terms in the list. It is very well possible to store information in each field of the field description about what is actually to be used as a search term when forming the list. The equal treatment of possibly parts of the field description and the field contents thereby is to be understood such that parts of the field description in some sense themselves form field contents which, however, then contain neither user data nor descriptors, but rather a description of the descriptors or the user data, respectively. These parts of the field description are so to speak quasi-field contents and may be treated during indexing like the actual field contents consisting of descriptors or user data, which means during the formation of the overall-index, or also when forming the logical list. This "atomization" of the individual data fields into field contents, respectively into quasi-field contents, enables a processing of the data stored in the individual data sets which reaches much further than in conventional databases. It leads to splitting up not only the individual data sets into fields, but also of the individual fields into field contents and field description, whereas the field description itself may again consist of quasi-field contents. These field contents and quasi-field contents are then treated absolutely in the same manner during the further processing. By this atomization it becomes possible to in principle access all individual parts of the data set separately, to search for them separately, to present them separately, to modify them separately, etc., no matter how small they are.

In principle all information contained in the field description, for example about the length of the data or also the administration information about the field contents as a whole or also the individual field contents, the UIP etc., may be atomized and treated as a quasi-field content. The field description then could again contain information about the individual quasi-field contents, which could then be regarded as quasi-descriptors of the quasi-field contents.

All information which are stored in a field, not only the field contents, but also arbitrary parts of the field contents or the field description thereby can, as far as they are defined by quasi-descriptors or by a superordinate rule or convention, be treated and processed in the same manner. In particular the so atomized components of the individual fields with respect to their structure may be generated, stored, and modified, in an arbitrary manner, and they may also be indexed and used as search terms as desired.

The condition for that is only that the data set as a whole is defined completely in its own without making reference to other data sets, and that all components of a data set, not only the individual fields, but also all further smaller components like field contents or also quasi-field contents, are defined by the data themselves which are contained in the data set in a complete manner. This complete description respectively definition of all, even the smallest, components of the data set is performed or takes place when the data set is created, or when it is input by the user. If the definition is completely generated, from that time on the so fully defined data set as well as all components defined according to the definition respectively the description of the data set may be individually accessed, individually searched, etc.

Because of the possibility of the database according to the present invention to store data sets of an arbitrary structure and to "atomize" arbitrary data sets, which means to completely define them with respect to their individual components, the database according to the present invention is capable of integrating not only all arbitrary data structures which may occur in the future into data stocks already existing, but also to create arbitrary new search criteria and search terms.

The overall-index is continuously generated from the unstructured database table, which means it represents the existing data of the unstructured database. When inserting a new data set or when modifying a data set in the unstructured database, one or more insertions of fields of the data set into the overall-index are generated.

The overall-index 520 shown in FIG. 5*b* contains in addition to the descriptor and the document ID also the information about the protective status (UIP). In particular, all user data are contained as search terms in the linear list, together with the corresponding descriptors and the corresponding data set number.

Thereby there results a relatively simple way of carrying out a search in the database when compared with conventional databases. In the case of conventional databases it is required that the following information are known: firstly, all potentially relevant tables and second the corresponding data structures of these tables. Therefore, if a certain user data value is searched, then it is necessary that the descriptor or at least a possible descriptor of the value is known. Therefore, a certain knowledge about the present data structure is necessary, for example to search for the search term "Paul". If the searcher does not know in which columns of the existing database tables the field content could be stored, any search remains incomplete. In particular, it is not possible to search for descriptors which are "Paul".

The relatively complicated search in a conventional database results from the table structure of the data in conventional databases. In the following at first the search for the search term "Paul" in a conventional database is described.

FIG. 6 shows for example the database table of a conventional database having the label "person information".

When searching, in case of the conventional database it at first has to be known in which table it may be searched, furthermore, one has to indicate in which columns (descriptors) the search term could occur. This may be done, for example, in the following manner:

Select*from person information where First Name=Paul or Last Name=Paul

If further columns would exist, which potentially could contain the information "Paul", so these columns also would have to be taken into account in the selection command. The selection in conventional databases therefore requires that before the selection is made the following information are known:

1. All potentially relevant tables.
2. The data structures of the corresponding tables.

However, this is not always the case and therefore the search possibilities are strongly limited. If it is for example to be checked which data sets within a database contain the information "Paul", no matter whether as a descriptor or whether as a user data value, then this is not possible without a knowledge of the tables and the data structures in conventional databases.

In case of the database management system according to the present invention, however, this search is much simpler. Since each field content is stored individually in connection with its descriptor and its data set number in a single index 700, as can be seen from FIG. 7, in case of the database according to the present invention the search may be carried out simply by the following command:

Select*where Paul

This search returns all data sets in which at least one data field, independent of the descriptor, contains the field content "Paul". In particular, even the data sets can be found in which "Paul" occurs as a descriptor.

Therefore no information about the structure of a table is necessary, as well as no information about with which descriptor the information "Paul" may occur together.

Of course, if such information is known, it may be used as an additional limiting criterion for the search. If it is, for example, known that "Paul" is a first name, so this may be used during the search as shown in the following:

Select*where first name=Paul

In the same manner also further criteria may be used.

From the overall-index 700 as shown in FIG. 7 one may note that not only the field contents but also the descriptors are stored as search terms. For example, also the data description "person information" is stored as search term, its descriptor, respectively its description thereby of course is "table". Without any problems one could imagine the overall-index 700 also in an extended manner, whereas, for example, the descriptor "table" then itself could be stored as a search term. The UIP is not shown in the overall-index 700 of FIG. 7. This information, however, is optional. It is required that a search term, a descriptor for the search term, and a data set number are stored in order to enable the corresponding data set to be found. The entry for the descriptor, however, may also remain empty.

Thereby in case of the database according to the present invention because of the two-fold and comparatively unstructured storage of the information contained in the database there results a very easy system maintenance as well as an easy access to the data of the database.

This results from the fact that with each storage of a data set the database management system defines this data set with respect to its structure. Thereby the so defined structure is readable even in the future in case of other data sets having the same structure. It is, however, not necessary that the database management system is adapted to a superordinate table structure in which several data sets are stored in an ordered manner.

The definition of the structure of a new data set to be stored can be carried out by the user himself in an easy manner, so that an extensive system maintenance is not necessary.

During the generation of the overall-index described before it is preferable that the overall-index is sorted according to the search term, either alphabetically, or in any other way so that it becomes easy to search in the linear lists and to access the corresponding data sets. When generating the overall-index from the unstructured database table preferably at least the user data are stored as search terms in the overall-index, possibly, as already mentioned, also the descriptors and/or parts of the field description. When generating the overall-index it is also possible to exclude individual fields from being incorporated into the overall-index according to the information contained in the field description. The actual generation therefore may be performed according to the information stored in the field description, for example the information contained in the UIP.

After having created the overall-index it may be divided into partial indices. This simplifies the access, respectively the administration, in case of very large data stocks, which are possibly only of less interest. The division is further preferable in case of the implementation in client-server systems, where different parts of the overall list are then loaded onto different clients. Thereby for example at one client the access or the search for business data, like debit notes, may be carried out, on another client the administration like for example the search for and the access to organization data like stock data, order data, etc., may be carried out. FIG. 11 shows such a division of the overall-index into partial indices.

The division of the index may possibly be extremely long because of the arbitrary structure of the data stored in the database table of arbitrary structure. Therefore the division into sub-indices respectively sub-lists according to different logical or temporal criteria may be carried out (e.g. period of time, receipt-type, time of storage keeping, like in case of the table of FIG. 5). Further, the list may be created according to access times or access frequencies onto the data. Such information then of course would also be stored in the field description of the individual fields, for example as a part of the UIP.

By means of the information in the UIP about at which time which search terms have been used, respectively when they have been stored for the first time, for example in connection with the person who did that, it becomes possible to extract/isolate a partial index from the overall-index which contains the search terms and descriptors for a particular set of users. The search terms and descriptors may be assigned or selected depending on the fact whether these terms or descriptors respectively field contents have been used/are used during the corresponding period of time, or depending on the fact whether these terms have been generated during that period of time.

If the period of time is amended, then new terms get into this partial index and others are leaving the partial index, because they do not belong anymore to the set of terms which have been created or used during that period of time.

If a mask for the data input respectively data representation is understood as a set of tuples of descriptors and of user data which are input together with the descriptors, then even the masks may be administrated by associating them with the descriptors, respectively with user data, used during some time. The access structures which are defined through the foregoing masks take part through the aforementioned tuples in the change depending on time by storing the masks themselves as data sets. Thereby the so stored masks form a view onto a part of the data stock which belongs to the corresponding mask.

Therefore by storing temporal information related to the search terms/descriptors in the UIP, the data sets themselves as well as the access masks onto the data may be monitored with respect to their temporal change. Therefore, a period of time "from-to" may be used as an additional limiting search criterion.

It is a property of the database according to the present invention that a complete description belongs to each data set, whereas the system automatically generates the overall-index from the sum of the data sets. The description of the data set as well as the data set itself may be amended in an arbitrary manner at any time. For each data set therefore always the corresponding user's view onto this data set may be stored together with the data set by storing corresponding information in the field description.

Figure 8:
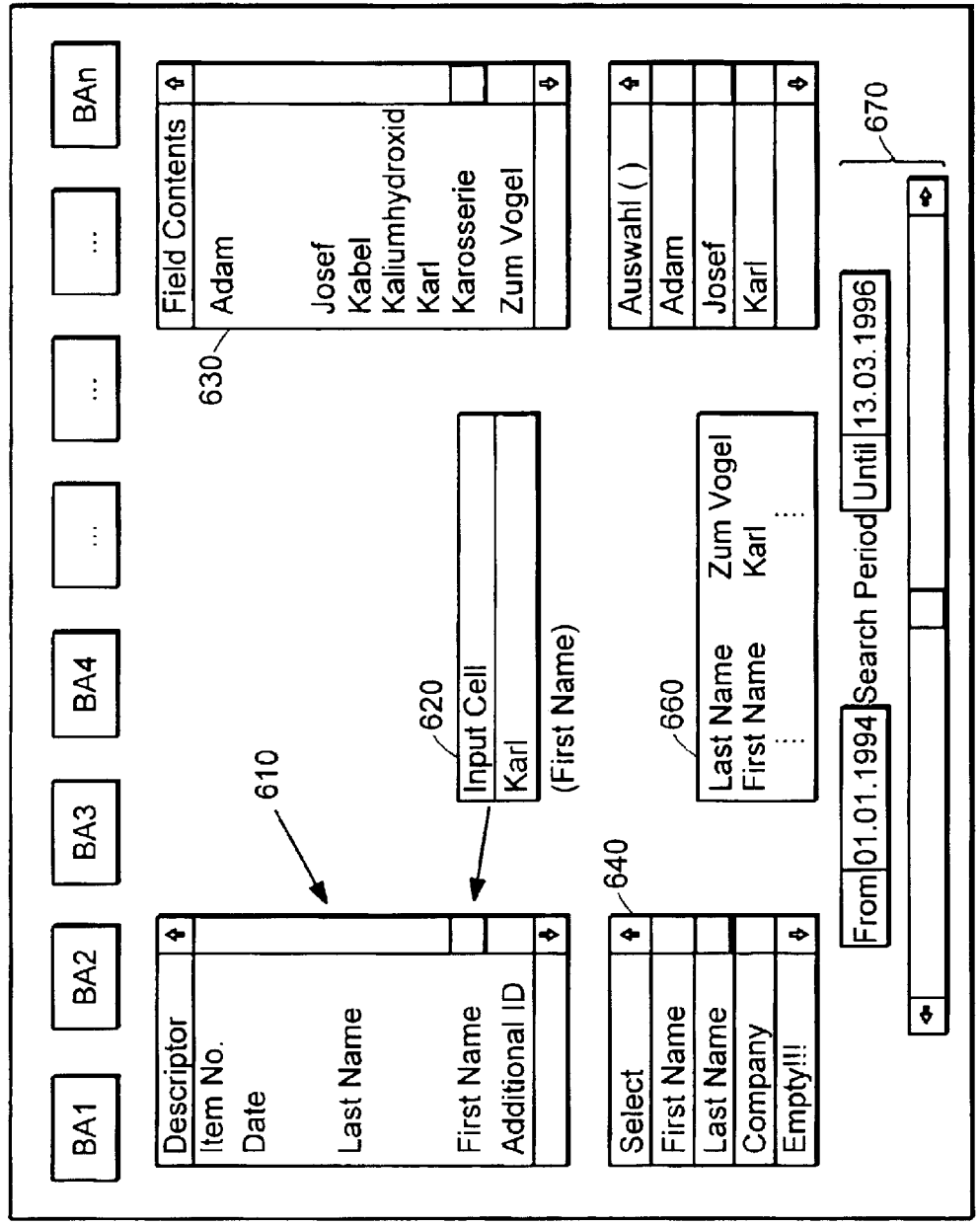
FIG. 8 shows an input mask for carrying out a search in a database according to the present invention.

An example for an input mask for a search in a database according to the present invention is shown in FIG. 8.

This input mask is displayed on the display of an input device when a search is to be carried out. A window 800 contains in an upper line icons BA1 to BAn for standard functions, like for calling standard input masks. By means of a left scroll window 610 descriptors may be selected to limit the search. In an input window 620 ("input line") the actual search term is input. In a scroll window 630 on the right side the found search terms are listed. In a scroll window 640 the possible descriptors are listed in case of the search not leading to an unambiguous result. By means of a scroll window 650 a search period may be defined.

If the term input into the input line is a user data value, and if in scroll window 610 no descriptor is selected as an additional limiting criterion, then in window 640 the descriptors which belong to this user data value appear, among which the user then may select one to further additionally limit the search. If, however, the term input into the input line 620 is a descriptor, then in window 650 the possible user data values are shown which are found for this descriptor in different data sets and possibly in different fields of different data sets. In the symmetry of this mask according to FIG. 8 with respect to user data values and descriptors there is reflected the already mentioned duality of user data values and corresponding descriptors, which results from the fact that the field contents when generating the overall-index are equally treated, no matter whether they are user data values or descriptors.

Possibly even several terms may be input, which then are commonly searched. The then resulting list of input criteria is shown in window 660.

In input line 620 the search term "Kar" is input. For the input search "Kar" in the present example no matching descriptors have been found so that the window 650 remains empty. The window 630 shows the found user data values (which are referred to in the Fig. somewhat inconsistently as "field contents"). One recognizes that no direct matches have been found since no user data value "Kar" exists in the data stock. Instead in alphabetical order similar user data values having the same first character are shown. During the input in addition to the search term also in window 610 a descriptor may be selected in order to further limit the search. If such a descriptor is selected, then of course in window 640 no list of corresponding descriptors is shown.

If no descriptor is additionally inserted, then there is no unambiguous match, and then there may for example be shown on the display a result consisting of a window as shown in FIG. 9. Consequently, data sets are found in which "Karl" is contained as a first name, as a company name, or as a pseudonym.

The search is configured such that if no unambiguous match is possible, then in the search mask (FIG. 8) the window 640 appears, which shows the descriptors under which the search term was found.

During the search with a mask according to FIG. 8, there may for example in case of no descriptor being input as additional information, the list of the possible descriptors be shown in window 640. From the possible descriptors the user may then select one, so that an unambiguous match is possible.

If an additional descriptor is also input, this may for example lead to a result as shown in FIG. 10. This result is then shown as a window on the display.

The described search, however, also the storage of a data set and the access to a certain data set or to several data sets, respectively, represent a certain view onto the database. Such views onto the database, for example the corresponding input formats, output formats, etc., again are information which may be stored as a data set into the database according to the present invention. This means that the information stored in the database may also extend to several views of different users and sets of users onto the database, respectively several input masks or input formats. The so stored input masks or input formats then are again linearized so that they themselves may also be searched. Together with the different views onto the database during their storage also information about the time when the view has been used may be stored. With this information then, with a proper indexing of the temporal information, during the search there may be defined a search period, as shown in window 670 of FIG. 8.

During the search only the views onto the database are found which fall into the defined search period.

What is claimed is:

1. A method for performing operations in a database system having a plurality of data sets that are stored into a storage of a computer, including the steps of:

Forming each data set to include an arbitrary number of fields, with each data set further including a field description in the form of metadata and an arbitrary number of field contents, with the metadata for each data set containing information regarding the structure of that data set that is not dependent on a structured data model for the database, wherein each field content comprises user data or a descriptor for the field content assigned to the descriptor, with the metadata of each data set defining the structure of the corresponding data set at least with respect to the field contends, and also with respect to the field description or parts of the field description, and further the metadata may include administrative information about the field contents; and Storing each data set in the storage of the computer so that the field contents are stored together with the corresponding metadata stored as a data set.

2. The method according to claim 1, further including the steps of:

storing the data sets each under a corresponding data set number in a storage;

forming an overall-index over field contents of fields of the stored data sets which means over field contents including user data and/or descriptors, and further over parts of the field description;

storing the overall-index in a storage.

3. The method according to claim 2, wherein a field of each data set is characterized by having as a field content a data set number characterizing this data set, whereas the descriptor of only the so characterized field designates the corresponding field content as data set number.

4. The method according to claim 2, further comprising the following steps:

storing the field contents consisting of user data of the stored data sets together with the corresponding field contents consisting of descriptors, with the data set number, and with a part of the field description in a logical list in a memory as n-tuple (n=4 as a minimum), and indexing the list over at least the field contents consisting of user data to an overall-index, over additional columns of the n-tuples, in particular over the filed contents consisting of descriptors and/or parts of the filed description, whereas the filed description contains information about the data type of field content, about the length of the field content, and information about the designation (user data or descriptor) of the field content, and storing the overall index in a storage.

5. The method according to claim 2, in which only field contents and/or parts of the field description are stored in the overall-index which are charaterized as to be stored in the overall-index by the field description.

6. The method according to claim 2, in which the field description contains information about the protective status of the corresponding field.

7. The method according to claim 2, in which the overall-index is split into partial indices.

8. The method according to claim 7, in which the division of the overall-index is carried out according to the period of time of the usage and/or the generation of the data by the user, and according to the person of the user, whereas the information about the time period and/or the generation and about the user is stored in the field description.

9. The method according to claim 2, further comprising the step:

searching the first and second overall-index according to predetermined search criteria and retrieving the corresponding data set.

10. The method according to claim 2, wherein the field description includes partial descriptions which may be indexed as quasi-field contents during the formation of the overall-index.

11. The method according to claim 1, wherein the field contents may remain empty.

12. The method according to claim 1, further comprising the step:

searching a data set which is to be amended according to predetermined search criteria;

modifying the data set to be amended;

storing the modified data set in storage means.

13. The method according to claim 1, further comprising the step:

searching a data set to be displayed according to a predetermined search criteria; and displaying of fields of the found data set on the display of the computer on a printer.

14. The method according to claim 13, wherein only the fields of the data set are displayed for which a display is allowed according to the information in the field descriptor (UIP).

15. The method according to claim 1, wherein views of the database in form of a mask used for the generation, input, search, modifications, and the display of data, are stored in storage means.

16. The method according to claim 1, further comprising the steps of:

during indexing, storing, searching, displaying, modifying, and during further processing steps with respect to the data sets as a whole or with respect to individual fields, the field contents including descriptors, and also parts of the field description including quasi-field contents, are processed and stored in a digital computer in a substantially similar manner.

17. The method according to claim 16, further including the steps of:

causing the field description to contain temporal information about the generation and/or access onto individual field contents or parts of the field description;

using the temporal information for the division of the overall-index into partial indices, with the partial indices containing the search terms and/or the descriptors which with respect to their creation time and/or their access time fall into a predetermined period of time.

18. A computer system for performing operations in a database system in which a plurality of data sets are stored in a computer, the computer system comprising:

an input device;

an output device;

a storage device with a database stored thereon which is capable of being accessed by means of a database management system through application programs; and a data processing system that is capable of forming each data set to include an arbitrary number of fields, with each data set further including a field description in the form of metadata and an arbitrary number of field contents, with the metadata for each data set containing information regarding the structure of that data set that is not dependent on a structured data model for the database, wherein each field content comprises user data or a descriptor for the field content assigned to the descriptor, with the metadata of each data set defining the structure of the corresponding data set at least with respect to the field contends, and also with respect to the field description or parts of the field description, and further the metadata may include administrative information about the field contents.

19. The computer system according to claim 18 wherein the system further includes a computer readable data carrier.

* * * * *